(12) United States Patent
Wu (10) Patent No.: US 12,117,859 B2
(45) Date of Patent: Oct. 15, 2024

(54) POWER GENERATION DEVICE AND SYSTEM CAPABLE OF MAXIMUM POWER TRACKING

(71) Applicant: SILLUMIN SEMICONDUCTOR CO., LTD., Shanghai (CN)

(72) Inventor: Guoming Wu, Shanghai (CN)

(73) Assignee: SILLUMIN SEMICONDUCTOR CO., LTD., Shanghai (CN)

( * ) Notice: Subject to any disclaimer, the term of this patent is extended or adjusted under 35 U.S.C. 154(b) by 459 days.

(21) Appl. No.: 17/436,252

(22) PCT Filed: Apr. 28, 2019

(86) PCT No.: PCT/CN2019/084785
§ 371 (c)(1),
(2) Date: Sep. 3, 2021

(87) PCT Pub. No.: WO2020/177204
PCT Pub. Date: Sep. 10, 2020

(65) Prior Publication Data
US 2022/0163991 A1    May 26, 2022

(30) Foreign Application Priority Data

Mar. 4, 2019   (CN) .......................... 201910159746.X (51) Int. Cl.
*H02J 3/38* (2006.01)
*G05F 1/67* (2006.01)

(52) U.S. Cl.
CPC ................ *G05F 1/67* (2013.01); *H02J 3/381* (2013.01); *H02J 2300/26* (2020.01)

(58) Field of Classification Search
None
See application file for complete search history.

(56) References Cited

U.S. PATENT DOCUMENTS 8,044,538 B2 * 10/2011 Ragonese ............... H02J 3/381
307/82
9,077,206 B2 * 7/2015 Zhang ..................... H02J 3/381
(Continued)

FOREIGN PATENT DOCUMENTS

CN       104854529 A     8/2015
CN       205788003 U     12/2016
(Continued)

*Primary Examiner* — Jason Lin
(74) *Attorney, Agent, or Firm* — NZ CARR LAW OFFICE (57) ABSTRACT

A power generation device capable of maximum power tracking includes a power generation assembly and at least one optimizer, the optimizer includes a maximum power tracking circuit, a drive control circuit, a first switch and a second switch arranged in a chip. The maximum power tracking circuit includes a voltage and current detection unit, a multiplier, and a maximum power tracking processing unit, wherein the multiplier is configured to multiply an assembly output voltage of the power generation assembly by an assembly output current of the power generation assembly to obtain an assembly output power of the power generation assembly; the maximum power tracking processing unit is configured to track and determine a current maximum power of the power generation assembly according to the assembly output power, determine the duty ratio signal according to the current maximum power, and send the duty ratio signal to the drive control circuit.

20 Claims, 5 Drawing Sheets

(56) References Cited

U.S. PATENT DOCUMENTS

| | | | |
|---|---|---|---|
| 10,651,739 B1* | 5/2020 | Li | H02J 7/35 |
| 10,752,116 B2* | 8/2020 | Symanow | B60R 16/033 |
| 11,251,749 B2* | 2/2022 | Padullaparthi | G06F 30/27 |
| 2005/0057215 A1* | 3/2005 | Matan | H02J 7/35 |
| | | | 320/101 |
| 2005/0121067 A1* | 6/2005 | Toyomura | H01L 31/02021 |
| | | | 136/244 |
| 2005/0172995 A1* | 8/2005 | Rohrig | H01L 31/02021 |
| | | | 136/243 |
| 2005/0286281 A1* | 12/2005 | Victor | H02M 7/48 |
| | | | 363/131 |
| 2007/0228838 A1* | 10/2007 | Delmerico | H02J 3/46 |
| | | | 307/84 |
| 2007/0247767 A1* | 10/2007 | Zhang | H02H 3/006 |
| | | | 361/42 |
| 2008/0121272 A1* | 5/2008 | Besser | H01L 31/02021 |
| | | | 136/248 |
| 2008/0122449 A1* | 5/2008 | Besser | G05F 1/67 |
| | | | 324/601 |
| 2009/0284240 A1* | 11/2009 | Zhang | G05F 1/67 |
| | | | 323/285 |
| 2010/0327659 A1* | 12/2010 | Lisi | H02J 3/381 |
| | | | 307/82 |
| 2012/0043823 A1* | 2/2012 | Stratakos | H03K 17/145 |
| | | | 307/82 |
| 2013/0049673 A1* | 2/2013 | Agarwal | H02J 7/0016 |
| | | | 320/157 |
| 2015/0091464 A1* | 4/2015 | Yagi | H05B 45/385 |
| | | | 315/201 |

FOREIGN PATENT DOCUMENTS

| | | |
|---|---|---|
| CN | 107248844 A | 10/2017 |
| CN | 108631592 A | 10/2018 |
| WO | WO-2011136143 A1 * | 11/2011 ............ H01M 10/46 |

* cited by examiner

POWER GENERATION DEVICE AND SYSTEM CAPABLE OF MAXIMUM POWER TRACKING

CROSSREFERENCE TO THE RELATED APPLICATIONS

This application is a National Stage Application of International Application No. PCT/CN2019/084785, filed on Apr. 28, 2019, which claims priority to Chinese Patent Application No. 201910159746.X, filed on Mar. 4, 2019, and entitled "POWER GENERATION DEVICE AND SYSTEM CAPABLE OF MAXIMUM POWER TRACKING", the entire contents of which are incorporated herein by reference.

TECHNICAL FIELD

The present invention relates to the technical field of power generation, in particular, to a power generation device and system capable of maximum power tracking.

BACKGROUND

Each power generation assembly has its own output power characteristics, and the maximum power output of the assembly can only be exerted at a specific voltage and current. However, the output of a single power generation assembly is usually insufficient to provide actual power requirements, so a power generation assembly array is often formed in series connection and in parallel connection to meet design requirements. In the prior art, the conversion from a direct current to an alternating current is required for the power generation assembly arrary (since the power generation assembly is usually in the direct current and needs to be converted to be in the alternating current before being connected in parallel to the actual civil or industrial electricity grid, resulting in a process called inversion, i.e., a process from the direct current to the alternating current) after the power generation.

In the prior art, before the conversion (i.e., before the direct current is converted into the alternating current), the same maximum power point tracking (MPPT) can be used to realize the maximum power point tracking of the assembly array. When the assembly is applied in series connection, the current passing though each assembly is equal, which can result in a mismatch of the power characteristics of the assembly. For example, when an assembly A operates at a maximum power point, the maximum power point may not be the current of a maximum power point of an assembly B, which may cause the assembly B to be unable to operate on its own maximum power point as the current of the series connection is the same, thereby resulting in a power loss of the assembly B.

Therefore, in the existing solution, a power optimizer with an independent maximum power point tracking MPPT function can be equipped for each power generation assembly; and the output of each power generation assembly is connected to an input end of the power optimizer. Each power generation assembly is connected to the power optimizer, and each assembly is a separate whole relative to the array while the output power may not be affected by other assemblies, so as to further enable the assembly to operate at the maximum power value under the current environmental conditions. Therefore, the condition that each assembly cannot work at its own maximum power point due to the above mismatch of the assembly can be avoided.

In the existing related art, the maximum power optimizer is usually implemented with a microprocessor MCU chip that is used for digital signal processing; in order to be adapted to information processing of the MCU chip, the MCU chip is required to be equipped with a sampling circuit to sample voltage and current information of the assembly, so as to calculate the power of the assembly. Meanwhile, since the sampling circuit collects analog signals and the MCU chip can only process digital signals, the optimizer is required to be equipped with an analog signal amplifier, an analog-digital signal converter and the like again, and the MCU outputs signals to pass through a pre-drive circuit to drive the corresponding out-built power transistor after calculating the maximum power point so as to reach a condition that the assembly array operates at the maximum power point. As such, the current solution is complex, has a lower degree of integration and has a higher cost. The higher cost causes the solution where the optimizer is equipped in this way not to be easy to popularize, thereby affecting the efficiency of the power generation assembly.

SUMMARY

The present invention provides a power generation device and system capable of maximum power tracking to solve the problems of complex solution, low degree of integration and high cost.

According to a first aspect of the present invention, a power generation device capable of maximum power tracking is provided, including a power generation assembly and at least one optimizer; the optimizer includes a maximum power tracking circuit, a drive control circuit, a first switch and a second switch arranged in a chip, wherein a first end of the first switch is connected to a positive output end of the power generation assembly, a second end of the first switch is connected to a first end of the second switch, and a second end of the second switch is connected to a negative output end of the power generation assembly; the second end of the first switch and the first end of the second switch are further connected to an intermediate port, and a power may be further output to a peripheral circuit of the chip through the intermediate port; the intermediate port is connected to the power generation device of a former stage;

the maximum power tracking circuit includes a voltage and current detection unit, a multiplier, and a maximum power tracking processing unit;

the voltage and current detection unit is configured to collect a voltage of the positive output end, a voltage of the negative output end and a voltage of the intermediate port; determine an assembly output voltage of the power generation assembly according to the voltage of the positive output end and the voltage of the negative output end; and determine a current of the first switch according to the voltage of the positive output end and the voltage of the intermediate port as an assembly output current of the power generation assembly;

the multiplier is configured to multiply the assembly output voltage of the power generation assembly by the assembly output current to determine an assembly output power of the power generation assembly;

the maximum power tracking processing unit is configured to track and determine a current maximum power according to the assembly output power, determine a duty ratio signal according to the current maximum power, and send the duty ratio signal to the drive control circuit; and the drive control circuit is connected to a control end of the first switch and a control end of the second switch respectively for controlling on-off of the first switch and the second switch according to the duty ratio signal, so as to regulate the output power of the power generation device.

The maximum power tracking processing unit, when determining the duty ratio signal according to the current maximum power, is specifically configured to:

determine a current reference voltage according to the current maximum power;

compare the current reference voltage with a current voltage of a voltage reference signal, and generate the duty ratio signal of a corresponding duty ratio according to a comparison result, wherein the voltage reference signal is a voltage signal of a sine waveform or a voltage signal of a triangular waveform.

Optionally, the maximum power tracking processing unit is further connected to the voltage and current detection unit;

the voltage and current detection unit is further configured to:

determine a current of the second switch according to the voltage of the negative output end and the voltage of the intermediate port, and add the current of the first switch to the current of the second switch to obtain an output current of the intermediate port;

the maximum power tracking processing unit is further configured to:

perform a regulation on the duty ratio signal if an output voltage of the intermediate port is not matched with a safety voltage interval corresponding thereto so that the voltage of the intermediate port is matched with the safety voltage interval corresponding thereto;

perform the regulation on the duty ratio signal if the output current of the intermediate port is not matched with a first safety current interval corresponding thereto or the current of the first switch is not matched with a second safety current interval corresponding thereto so that the output current of the intermediate port is matched with the first safety current interval corresponding thereto and the current of the second switch is matched with the second safety current interval corresponding thereto; and give priority to the safety regulation if the safety regulation conflicts with the duty ratio signal determined according to the current maximum power.

Optionally, the drive control circuit includes a logic control unit, a first drive unit and a second drive unit, wherein an input end of the logic control unit is connected to the maximum power tracking circuit for receiving the duty ratio signal, generating a first drive signal and a second drive signal according to the duty ratio signal, and sending the first drive signal to the first drive unit and sending the second drive signal to the second drive unit;

the logic control unit is connected to the first drive unit and the second drive unit respectively, an output end of the first drive unit is connected to the control end of the first switch, and an output end of the second drive unit is connected to the control end of the second switch; and the first drive unit is configured to control the on-off of the first switch according to the first drive signal, and the second drive unit is configured to control on-off of the second switch according to the second drive signal.

Optionally, a power supply end of the first drive unit is connected to an internal power supply circuit through a power supply control switch, the power supply end of the first drive unit is further connected to one end of a boot-strap capacitor, and the other end of the boot-strap capacitor is connected to the intermediate port.

Optionally, the optimizer further includes the internal power supply circuit, the internal power supply circuit is directly or indirectly connected to the positive output end, and the internal power supply circuit is connected to the drive control circuit for powering the drive control circuit by using an output electric energy of the power generation assembly.

Optionally, the internal power supply circuit includes a low dropout linear regulator, an input end of the low dropout linear regulator is directly or indirectly connected to the positive output end, and an output end of the low dropout linear regulator is directly or indirectly connected to the drive control circuit.

Optionally, the device further includes a reference voltage generation circuit, and the reference voltage generation circuit is connected to the internal power supply circuit and the maximum power tracking circuit respectively for providing the maximum power tracking circuit with a reference voltage for determining the duty ratio signal by using the power supply of the internal power supply circuit.

Optionally, the optimizer further includes an over-temperature protection circuit and an enable control circuit;

the over-temperature protection circuit is configured to detect temperature information of the optimizer, and send a specific enable signal to the enable control circuit when the temperature information is higher than a temperature threshold value;

the enable control circuit is connected to the drive control circuit for controlling the first switch to be turned off by using the drive control circuit when receiving the specific enable signal, so as to disconnect the intermediate port from the power generation assembly and turn on the second switch.

Optionally, the device further includes a communication circuit and a communication interface assembly, wherein the communication circuit interacts and communicates externally through the communication interface assembly, and is capable to perform analog-digital conversion on temperature information, assembly output information and device output information of the optimizer and send externally the temperature information, assembly output information and device output information of the optimizer through the communication interface assembly after the analog-digital conversion, as well as receive external information transmitted externally through the communication interface assembly and performing the analog-digital conversion on the external information so that threshold value information may be determined according to the external information;

the assembly output information includes at least one of the assembly output voltage of the power generation assembly, the assembly output current of the power generation assembly and the assembly output power of the power generation assembly.

The device output information includes at least one of a device output voltage of the power generation device, a device output current of the power generation device and a device output power of the power generation device.

The threshold value information includes at least one of a temperature threshold value, a voltage threshold value corresponding to the safety voltage interval and a current threshold value corresponding to the safety current interval.

According to a second aspect of the present invention, a power generation system capable of maximum power tracking is provided, including at least two power generation devices capable of maximum power tracking connected in sequence involved in the first aspect and optional solutions thereof.

The power generation device and system capable of maximum power tracking provided by the present invention may directly or indirectly connect the input end of the maximum power tracking circuit to the positive output end, the negative output end and the intermediate port, to collect a voltage of the positive output end, a voltage of the negative output end and a voltage of the intermediate port.

The present invention avoids the problem of the existing maximum power point tracking in digital form, wherein the voltage and current information of the power generation assembly is sampled to obtain the power information by the analog multiplier so as to regulate the duty ratio for realizing tracking the maximum power point of the power generation assembly, so that the analog-digital conversion and the operation amplification based on the analog-digital conversion are avoided, thereby simplifying the peripheral devices, effectively reducing the cost and facilitating the integration of the circuits in the optimizer as well as realizing a high degree of integration. Meanwhile, compared to the optimized control of digital signals, the calculation time of the micro processor is saved, and the analog circuit may also have a quick responding speed and a higher processing precision. Since the cost is reduced, the power generation efficiency of the assembly is improved and the degree of acceptance of the technology is very high, thereby enabling green energy saving, and facilitating the rapid promotion and mass production of the technology.

BRIEF DESCRIPTION OF THE DRAWINGS

In order to describe the embodiments of the present invention or the technical scheme in the prior art more clearly, brief introduction on drawings needed to be used in the embodiment will be made below. It is obvious that the drawings described below are merely some embodiments of the present invention, and those skilled in the technical field further can obtain other drawings according to the drawings without creative efforts.

DESCRIPTION OF REFERENCE NUMERALS

1—power generation assembly;
2—optimizer;
201—maximum power tracking circuit;
2011—voltage and current detection unit;
2012—multiplier;
2013—maximum power tracking processing unit;
2014—oscillator;
202—drive control circuit;
2021—first drive unit;
2022—second drive unit;
2023—logic control unit;
203—first switch;
204—second switch;
205—intermediate port;
206—power source positive port;
207—power source negative port;
208—internal power supply circuit;
2081—low dropout linear regulator;
209—reference voltage generation circuit;
210—over-temperature protection circuit;
211—enable control circuit;
212—enable port;
213—information acquisition circuit;
214—communication circuit;
2141—analog-digital conversion unit;
2142—communication control unit;
2143—digital-analog conversion unit;
215—communication interface assembly;
3—device output capacitor;
4—communication module.

DETAILED DESCRIPTION OF THE EMBODIMENTS

Clear and intact description will be made on technical schemes in the embodiments of the present invention below in combination with drawings in the embodiments of the present invention. Obviously, the described embodiments are merely a part of embodiments of the present invention and are not all the embodiments. Based on the embodiments of the present invention, all the other embodiments obtained by those of ordinary skill in the art without inventive effort are within the scope of the present invention.

Terms "first", "second", "third", "fourth", and the like (if any) in the specification and claims of the present invention and the foregoing accompanying drawings are used to distinguish similar objects, but do not need to be used for describing a specific sequence or an order. It should be understood that data used in this way can be interchanged under appropriate circumstances, so that the embodiments of the present invention described herein can be implemented in an order other than those illustrated or described herein. In addition, terms "including", "having", and any variations thereof are intended to cover non-exclusive inclusions, for example, processes, methods, systems, products, or devices that contain a series of steps or units need not be limited to those clearly listed steps or units, but may include other steps or units not explicitly listed or inherent to these processes, methods, products, or devices.

The technical solutions of the present invention are described in detail below with reference to the specific embodiments. The following several embodiments may be combined with each other, and a same or similar concept or process may not be described again in some embodiments.

Figure 1:
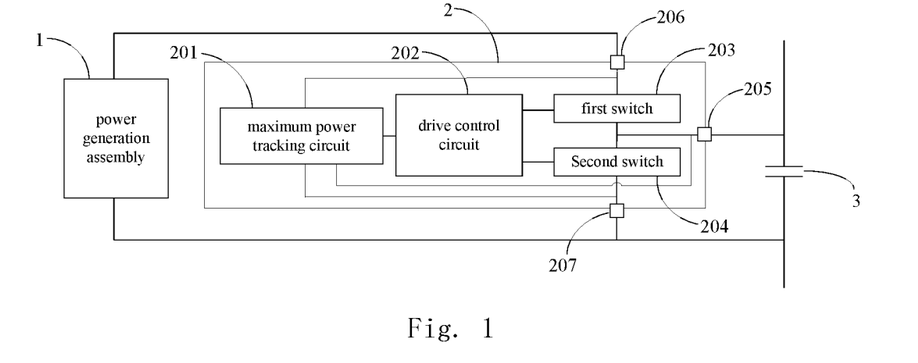
FIG. 1 is a circuit diagram of a power generation device capable of maximum power tracking according to a first embodiment of the present invention.

FIG. 1 is a circuit diagram of a power generation device capable of maximum power tracking according to a first embodiment of the present invention.

With reference to FIG. 1, the power generation device capable of maximum power tracking includes a power generation assembly 1 and an optimizer 2, wherein the optimizer 2 includes a maximum power tracking circuit

201, a drive control circuit 202, a first switch 203 and a second switch 204 arranged in a chip.

The power generation assembly 1 involved above may be, e.g., a photovoltaic power generation assembly, and in other optional embodiments may also be a kinetic power generation assembly, a wind power generation assembly and the like.

A first end of the first switch 203 is connected to a positive output end of the power generation assembly 1, a second end of the first switch 203 is connected to a first end of the second switch 204, and a second end of the second switch 204 is connected to a negative output end of the power generation assembly 1; the second end of the first switch 203 and the first end of the second switch 204 are further connected to an intermediate port 205, and a power may be output to a peripheral circuit of the chip through the intermediate port 205; the intermediate port 205 is connected to the power generation device of a former stage, specifically to a negative output end of the power generation device of a former stage.

In the present embodiment, an input end of the maximum power tracking circuit 201 may be directly or indirectly connected to the positive output end, the negative output end and the intermediate port, to directly collect a voltage of the positive output end, a voltage of the negative output end and a voltage of the intermediate port, by the connection outside the chip or by the provision of the circuit on the chip.

For example, one input end of the maximum power tracking circuit 201 and the first end of the first switch 203 may together be connected to a power source positive port 206, and the power source positive port 206 may be connected to the positive output end of the power generation assembly 1; the other input end of the maximum power tracking circuit 201, the second end of the first switch 203 and the first end of the second switch 204 may together be connected to the intermediate port 205; further another input end of the maximum power tracking circuit 201 and the second end of the second switch 204 may together be connected to a power source negative port 207, and the power source negative port 207 may be connected to the negative output end of the power generation assembly 1. In other examples, the maximum power tracking circuit 201 may also be directly connected to the positive output end and the negative output end of the power generation assembly 1 via other ports.

It can be seen that regardless of the connection ways, the present invention will not depart from the description of the present embodiment as long as the voltage is directly obtained and the calculation and determination of the analog amount are performed for the information such as the current and the power based on the obtained voltage, i.e., no analog-digital conversion is performed for the signal obtained by sampling.

Based on the above means, in the present embodiment, the analog-digital conversion and the operation amplification based on the analog-digital conversion are avoided, thereby simplifying the devices, effectively reducing the cost and facilitating the integration of the circuits in the optimizer as well as realizing a high degree of integration. Meanwhile, compared to the optimized control of digital signals, the analog circuit may also have a quick responding speed and a higher processing precision.

The first switch 203 and the second switch 204 may be understood such that any two ends may be conducted, and there is a control end to further control the conversion of on-off of the devices via the control end; during a specific implementation process, the first switch 203 and the second switch 204 may be MOS transistors, e.g., NMOS transistors.

Further, by way of double high-voltage NMOS, the area is saved while realizing lower switch resistance, which facilitates realizing higher conversion efficiency.

The drive control circuit 202 is connected to the control end of the first switch 203 and the control end of the second switch 204 respectively for controlling on-off of the first switch 203 and the second switch 204 according to a duty ratio signal, so as to regulate a device output power of the power generation device.

The intermediate port 205 may be connected to a first end of a device output capacitor 3 of the power generation device, a second end of the device output capacitor 3 may be connected to the negative output end of the power generation assembly 1, and further two ends of the device output capacitor 3 may be connected to a power generation device of a former stage and a power generation device of a latter stage respectively. The intermediate port 205 may be connected to the device output capacitor 3 via an inductor L, and the inductor L may be combined with the device output capacitor 3 to function as an LC filter.

In an example, the intermediate port 205 outputs a square waveform signal, which may be formed into a DC voltage after being filtered by the LC filter. The voltage needs to be limited in the present embodiment may be understood as the DC voltage. However, due to the inductor arranged in the middle position, the DC voltage filtered by the LC filter may not be directly sampled, and a DC voltage equivalent to an external LC filter is obtained after filtering the square waveform voltage of the intermediate port 205 by a resistance capacitor RC inside the chip. The duty ratio is regulated after the DC voltage is sampled so as to prevent the DC voltage from being too high.

When the first switch 203 is off and the second switch 204 is on, the power generation device of the latter stage may be in series connection with the power generation device of the former stage via the second switch 204, and further the power generation assembly 1 of the power generation unit may be disconnected from a main path. Correspondingly, when the first switch 203 is on and the second switch 204 is off, the power generation assembly 1 of the present power generation device may be connected to the main path, and further the device is used to output the electric energy of the assembly.

It can be seen that the current of the other assemblies may directly pass through the second switch 204 of the device by opening the second switch 204 so as to further not affect normal operation of other assemblies in the entire series-connected assembly array.

In the present embodiment, since the voltage and current are directly used to obtain the power signal to regulate the duty ratio, the on-off of the first and second switches is controlled by the duty ratio signal; this solution may be understood as MPPT based on analog signal, and hence may also be understood as AMPPT solution, wherein the AMPPT may be specifically be understood as Analog Maximum Power Point Tracking.

Figure 2:
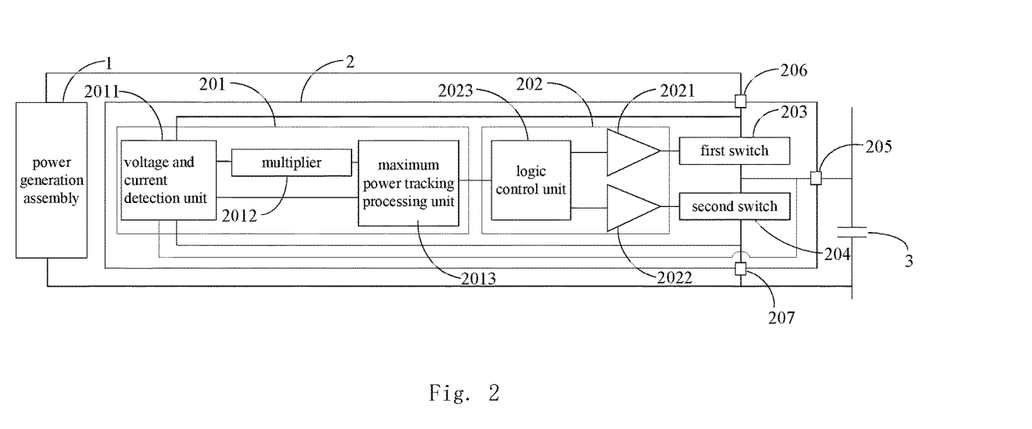
FIG. 2 is a circuit diagram of a power generation device capable of maximum power tracking according to a second embodiment of the present invention.

FIG. 2 is a circuit diagram of a power generation device capable of maximum power tracking according to a second embodiment of the present invention.

With reference to FIG. 2, the maximum power tracking circuit 201 includes a voltage and current detection unit 2011, a multiplier 2012, and a maximum power tracking processing unit 2013.

The voltage and current detection unit 2011 is configured to collect a voltage of the positive output end, a voltage of the negative output end and a voltage of the intermediate port, as well as determine an assembly output voltage of the power generation assembly 1 according to the voltage of the positive output end and the voltage of the negative output end; specifically, the assembly output voltage may be understood as a potential difference between the positive output end and the negative output end.

The voltage and current detection unit 2011 is further configured to determine a current of the first switch according to the voltage of the positive output end and the voltage of the intermediate port 205 as an assembly output current of the power generation assembly 1; specifically, the solution may be understood as: under a condition that the resistance of the first switch 203 may be determined, since the voltage of the positive output end is the voltage of the power source positive port 206, the voltage between the first end and the second end of the first switch is a voltage difference between the voltage of the positive output end and the voltage of the intermediate port 205 when the first switch 203 is on, and then the assembly output current may be calculated according to the voltage difference and the resistance of the first switch 203.

It can be seen that in the present embodiment, the required current and power etc. may also be obtained based on the analog amount without converting the signal of the electrical parameter into the signal of the digital parameter, so as to meet the requirements for the calculation and processing of the subsequent non-digital processing.

The multiplier 2012 is configured to multiply the assembly output voltage of the power generation assembly by the assembly output current of the power generation assembly to obtain an assembly output power of the power generation assembly 1. For example, a voltage characterizing the assembly output power of the power generation assembly 1 may be obtained.

With the multiplier 2012, the power information may be suitably obtained in the case of non-digital processing, so as to meet the requirements for maximum power tracking of the subsequent non-digital processing.

The maximum power tracking processing unit 2013 is configured to track and determine a current maximum power according to the assembly output power, determine a duty ratio signal according to the current maximum power, and send the duty ratio signal to the drive control circuit. The voltage of the assembly output power of the power generation assembly 1 regulates the duty ratio signal, and the duty ratio signal controls the on-off of the first switch and the second switch through the drive circuit, thereby enabling the power generation assembly to operate in a maximum power output state.

The duty ratio signal may be understood as any signal based on pulse width modulation, and the maximum power tracking circuit 201 may output duty signals with different duty ratios for different current maximum powers. In addition, the duty ratio signal may be understood as a PWM signal, i.e., a pulse width modulation signal.

Any means for implementing the maximum power tracking processing unit 2013 can fall into the protection scope of the present embodiment. Meanwhile, an specific implementation way of the present embodiment will be described as below.

A history output power is stored; further the current output power of the assembly is compared with the assembly output power of the previous period, wherein if the assembly output power is greater than the output power of the previous period, the assembly output power is determined not to reach the maximum output power; if the assembly output power is smaller than the output power of the previous period, the assembly output power is determined to have reached the maximum output power. It can be seen that the current maximum power may be determined according to at least a part of history data of the assembly output power.

Therefore, through dynamic detection and regulation of the duty ratio signal, the assembly may be enabled to operate in the maximum power point state all the time. The process of determining the duty ratio signal according to the current maximum power may be understood as as: how the current duty ratio may be adjusted to meet the requirements for the maximum power output may be determined according to the history output power of the assembly, e.g., changes in the time for which the first switch is on and the second switch is off may be used to achieve the maximum power point tracking. Determining the duty ratio signal may, for example, include adjusting the duty ratio of the duty ratio signal.

In actual implementation, the adjustment of the duty ratio signal may be achieved with combination of the reference voltage; for example, the voltage of a sine or triangular waveform is compared with the reference voltage, and further the duty ratio signal is determined according to the comparison results, wherein if the reference voltages are different, the duty ratios of the duty ratio signals generated by the comparison are different. Therefore, in actual implementation, the adjustments and changes of the reference voltage may be used to achieve the adjustment of the duty ratio signal.

If the above voltage of a sine or triangular waveform is understood as a pre-set voltage reference signal, the above process may be specifically described as follows:

the maximum power tracking processing unit, when determining the duty ratio signal according to the current maximum power, is specifically configured to:

determine a current reference voltage according to the current maximum power, wherein the determination may be a determination of a value of the reference voltage after required changes, or may be determination on how to change the reference voltage as required;

compare the current reference voltage with a current voltage of a voltage reference signal, and generate the duty ratio signal of a corresponding duty ratio according to a comparison result, wherein the voltage reference signal is a voltage signal of a sine waveform or a voltage signal of a triangular waveform.

Since the current reference voltage is determined according to the current maximum power, the assembly output power may be enabled to reach the current maximum power under the control of the corresponding duty ratio signal.

In the present embodiment, an optimizer is configured for each assembly, and an integrated circuit formed may automatically track the maximum power point of a mismatched power generation assembly, so as to maximize each assembly power output.

In addition, the voltage and current detection unit 2011 is further configured to calculate a device output current according to a voltage difference between the voltage of the positive output end and the voltage of the intermediate port and a voltage difference between the voltage of the negative output end and the voltage of the intermediate port as well as the corresponding resistance, and to treat the voltage of the intermediate port as a device output voltage.

Further, the multiplier 2012 may calculate according to the assembly output current and the assembly voltage to obtain the assembly output power, e.g., to obtain the voltage characterizing the assembly output power.

In an embodiment, with reference to FIG. 2, the maximum power tracking processing unit 2013 is further connected to the voltage and current detection unit 2011;

the voltage and current detection unit 2011 is further configured to:

determine a current of the second switch 204 according to the voltage of the negative output end and the voltage of the intermediate port 205, and add the current of the first switch 203 to the current of the second switch 204 to obtain an output current of the intermediate port 205;

the maximum power tracking processing unit 2013 is further configured to:

perform a safety regulation on the duty ratio signal if an output voltage of the intermediate port 205 is not matched with a safety voltage interval corresponding thereto so that the voltage of the intermediate port is matched with the safety voltage interval corresponding thereto;

perform a safety regulation on the duty ratio signal if the output current of the intermediate port 205 is not matched with a first safety current interval corresponding thereto and the current of the first switch is not matched with a second safety current interval corresponding thereto so that the output current of the intermediate port is matched with the first safety current interval corresponding thereto and the current of the second switch is matched with the second safety current interval corresponding thereto.

In addition, if the duty ratio signal is regulated based on the safety voltage interval and the safety current interval, the regulation should take precedence over regulating the duty ratio signal of the maximum power, i.e., giving priority to the safety regulation if the safety regulation conflicts with the duty ratio signal determined according to the current maximum power.

The safety voltage interval may be, for example, an interval smaller than a certain voltage threshold value, and further any case where the interval is greater than the voltage threshold value may be understood as to be the mismatch with respect to the safety voltage interval. In other words, any case where the voltage threshold value needs to be judged may be understood as a case of judging whether to be matched with the safety voltage interval. Similarly, the first safety current interval and the second safety current interval may be, for example, an interval smaller than a certain current threshold value, and further any case where the interval being greater than the corresponding current threshold value may be understood as the mismatched with respect to the corresponding safety current interval. In other words, any case where the current threshold value needs to be judged may be understood as a case of judging whether to be matched with the safety current interval.

In addition, the match involved above includes two cases: a direct match and an indirect match. For example, the match between the voltage of the intermediate port or the corresponding DC voltage thereof and one safety voltage interval may be understood as the direct match; the match between the voltage of the intermediate port or, e.g., a sum of the average of the corresponding DC voltage and the safety voltage interval may be understood as the indirect match; the match between the voltage of the intermediate port or another voltage related to the corresponding DC voltage and the corresponding safety voltage interval may be understood as the indirect match. Similarly, for the judgment of the case of related over-current the mismatch may also include two cases: the direct match and indirect match.

Through the above embodiment, the protection for over-voltage and over-current may be achieved. Further, the output voltage or current may be stabilized at a certain per-set value, thereby ensuring a stabilized operation of the entire power generation system. The over-voltage protection is implemented for the device output voltage, i.e., for the intermediate port 205. The over-current protection includes two parts, one of which is the protection for the output current of the power generation assembly, i.e., the current protection of the first switch, and the other of which is the protection for the device output current, i.e., the current protection of the intermediate port 205, wherein the current is the sum of the current of the first switch and the current of the second switch. The current may be output to a load after passing through the intermediate port 205 to an external inductor, which also requires the over-current protection.

The maximum power tracking processing unit 2013 may achieve the maximum power tracking and further functions of outputting the duty ratio signal and over-voltage and over-current protection through different programs respectively, may also achieve the maximum power tracking and further functions of outputting the duty ratio signal and over-voltage and over-current protection through different circuit structures, and may also achieve the maximum power tracking and further functions of outputting the duty ratio signal through a first combination way of software and circuit structures and then achieve the function of over-voltage and over-current protection through a second combination way of the software and the circuit structures.

It can be seen that regardless of the ways with software, hardware, or the combination the software and hardware, the solution of achieving the above functions may not depart from the description of the present embodiment.

In actual implementation, in the AMPPT algorithm, the duty ratio signal may be periodically regulated according to the input current power signal. The duty ratio signal enters the logic control unit to control the time for which the first switch and the second switch are off and on, thereby regulating the device output power. The AMPPT algorithm may constantly regulate the duty ratio signal according to the comparison between the input current power signal and the history power signal, and finally enable the assembly output power to maintain at a maximum value dynamically.

Moreover, the optimizer of the present embodiment may further facilitate automatic regulation of the output current to match the current of the main path. In this way, the assembly with poorer power generation performance is enabled to change from a load into a power source, thereby improving the conversion efficiency of the entire device. In order to maximize the power generation performance of the device, the AMPPT algorithm of the chip enables each assembly to operate in the maximum power point state, so as to improve the power generation efficiency without considering the mismatch of the maximum power point of the assembly. Although some assemblies are affected partially, the power of the parts that are not affected may still be converted through the chip.

In an embodiment, with reference to FIG. 2, the drive control circuit 202 includes a logic control unit 2023, a first drive unit 2021 and a second drive unit 2022. The drive unit may also be understood to be in a drive level.

An input end of the logic control unit 2023 is connected to the maximum power tracking circuit 201 for receiving the duty ratio signal, generating a first drive signal and a second drive signal according to the duty ratio signal, and sending the first drive signal to the first drive unit 2021 and sending the second drive signal to the second drive unit 2022.

The logic control unit 2023 is connected to the first drive unit 2021 and the second drive unit 2022 respectively, an output end of the first drive unit 2021 is connected to the control end of the first switch 203, and an output end of the second drive unit 2022 is connected to the control end of the second switch 204.

The first drive unit 2021 is configured to control the on-off of the first switch 203 according to the first drive signal, and the second drive unit 2022 is configured to control on-off of the second switch 204 according to the second drive signal.

Through the logic control unit 2023, the first drive unit 2021 and the second drive unit 2022 may be prevent from being on simultaneously.

The first drive unit 2021 and the second drive unit 2022 may be any device or a combination of the devices that may achieve the control of the on-off.

Figure 3:
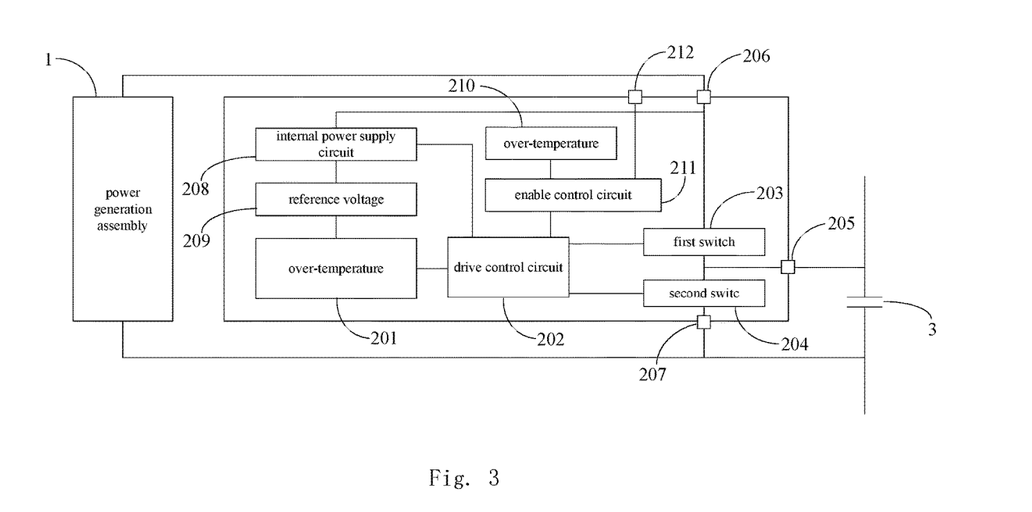
FIG. 3 is a circuit diagram of a power generation device capable of maximum power tracking according to a third embodiment of the present invention.

FIG. 3 is a circuit diagram of a power generation device capable of maximum power tracking according to a third embodiment of the present invention.

With reference to FIG. 3, the optimizer 2 further includes an internal power supply circuit 208, the internal power supply circuit 208 is directly or indirectly connected to the positive output end, and the internal power supply circuit 208 is connected to the drive control circuit 202 for powering the drive control circuit 202 by using an output electric energy of the power generation assembly 1. In actual implementation, the internal power supply circuit 208 may connected to the positive output end via a power source positive port 206.

It can be seen that the present embodiment may achieve internal power supply with the power supply of the power generation assembly 1.

In the present embodiment, the device further includes a reference voltage generation circuit 209, and the reference voltage generation circuit 209 is connected to the internal power supply circuit 208 and the maximum power tracking circuit 201 respectively for providing the maximum power tracking circuit 201 with a reference voltage for determining the duty ratio signal by using the power supply of the internal power supply circuit 208.

Based on the above description, the maximum power tracking processing unit of the maximum power tracking circuit 201 may adjust the input reference voltage to meet the requirements for the required duty ratio signal.

In an embodiment, the optimizer 2 further includes an over-temperature protection circuit 210 and an enable control circuit 211.

The enable control circuit 211 is connected to the drive control circuit 202 for controlling the off of the first switch 203 and the on of the second switch 204 by using the drive control circuit 202 when receiving a specific enable signal, and then the current of other assemblies may pass through the second switch 204, so that the normal operation of the system may not be affected. The enable control circuit 211 may receive the specific enable signal and a normal operation enable signal via an enable port 212.

Meanwhile, if the enable control circuit 211 receives another normal operation enable signal, the drive control circuit 202 may be driven to operate normally, i.e., the chip maintaining the normal operation. In actual implementation, the specific enable signal may be at a low level, and the normal operation enable signal may be at a high level.

In addition, the reception and processing of the specific enable signal may turn on the second switch 204 when the assembly voltage is too low to be normally output, so that the current of other assemblies passes directly through the second switch 204, thereby not affecting the normal operation of the entire assembly array.

In an embodiment, the reception and processing of the specific enable signal may be triggered when the temperature is too high, thereby prevent the chip from being damaged or affected by other adverse effects due to over-temperature, wherein the over-temperature protection circuit 210 is configured to detect temperature information of the optimizer, and send the specific enable signal to the enable control circuit 211 when the temperature information is higher than a temperature threshold value.

The temperature information may be generated by any temperature detection device, which may detect the temperature of a specific position of the chip or detect the temperature determined by summing each temperature of the chip. Further, any circuit structure that may realize the temperature detection and the temperature comparison may not be depart from the description of the above embodiment.

Meanwhile, the over-temperature protection circuit 210 may also powered by the internal power supply circuit 208, or may be powered by another port that can provide a power source.

Figure 4:
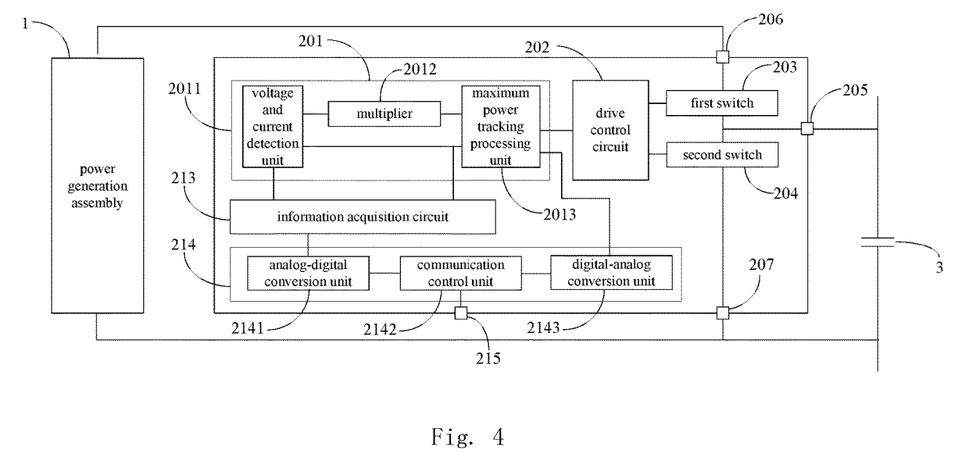
FIG. 4 is a circuit diagram of a power generation device capable of maximum power tracking according to a fourth embodiment of the present invention.

FIG. 4 is a circuit diagram of a power generation device capable of maximum power tracking according to a fourth embodiment of the present invention.

With reference to FIG. 4, the device further includes a communication circuit 214 and a communication interface assembly 215, wherein the communication circuit 214 interacts and communicates externally through the communication interface assembly 215, and may send externally at least one of the temperature information, assembly output information, device output information, assembly over-current indication information, device over-current indication information, device over-voltage indication information of the optimizer.

The assembly output information includes at least one of the assembly output voltage of the power generation assembly, the assembly output current of the power generation assembly and the assembly output power of the power generation assembly.

The device output information includes at least one of a device output voltage of the power generation device, a device output current of the power generation device and a device output power of the power generation device.

The assembly over-current indication information is used to characterize the occurrence of a condition of over-current of the assembly output current, and the condition may be, e.g., the condition where the current of the first switch is not matched with the second safety current interval as mentioned above. The device over-current indication information is used to characterize the occurrence of a condition of over-current of the device output current, and the condition may be, e.g., the condition where the output current of the intermediate port is not matched with the first safety current interval as mentioned above. The device over-voltage indication information is used to characterize the occurrence of a condition of over-voltage of the device output voltage, and the condition may be, e.g., the condition where the output voltage of the intermediate port is not matched with the safety voltage interval as mentioned above.

Since the communication circuit 214 interacts and communicates externally, the information sent externally may further be received in addition to sending information externally. For example, the external information used to determine the voltage threshold value, the current threshold value, the temperature threshold value and the like as mentioned above may be received externally by the communication circuit 214.

In an embodiment, the communication circuit may also receive the external information sent externally and perform the analog-digital conversion on the information sent externally through the communication interface assembly, so that the threshold value information may be determined according to the information sent externally, e.g., may be identified by the maximum power tracking processing unit to determine the threshold value. The threshold value information may include at least one of a temperature threshold value, a voltage threshold value corresponding to the safety voltage interval and a current threshold value corresponding to the safety current interval.

Further, the communication circuit 214 may further include an analog-digital conversion unit 2143 for performing the analog-digital conversion on the signal of the external information, wherein the converted information sent externally may be transmitted to the corresponding circuit part, e.g., the information sent externally used to determine the temperature threshold value may be transmitted to the over-temperature protection circuit 210, and the information sent externally used to determine the voltage threshold value and the information sent externally used to determine the current threshold value may be transmitted to the maximum power tracking circuit 201, specifically to the maximum power tracking processing unit 2013. It can be seen that the analog-digital conversion unit 2143 may be connected to at least one of the over-temperature protection circuit 210 and the maximum power tracking circuit 201 respectively.

In an embodiment, in order to obtain the information required to be transmitted externally as mentioned above, the device may further include an information acquisition circuit 213, wherein the information acquisition circuit 213 may be connected to the voltage and current detection unit 2011 and the multiplier 2012 respectively.

Therefore, the information acquisition circuit may be understood as any circuit structure that can receive and transmit information and electrical signals.

In actual implementation, the communication circuit 214 may include an analog-digital conversion unit 2141 and a communication control unit 2142, wherein further, before the information is sent, the analog-digital conversion unit 2141 may be used to convert an analog signal of at least one of the temperature information, the assembly output information and the device output information of the optimizer into a digital signal for further transmitting the signal.

Using the communication control unit 2142 may facilitate the transmittance management for transmitting the information.

It can be seen that the communication process implemented by the above embodiment may facilitate realizing daily control and communication, guaranteeing the normal operation requirements of the optimizer and timely feedback and adjustment of related information.

Figure 5:
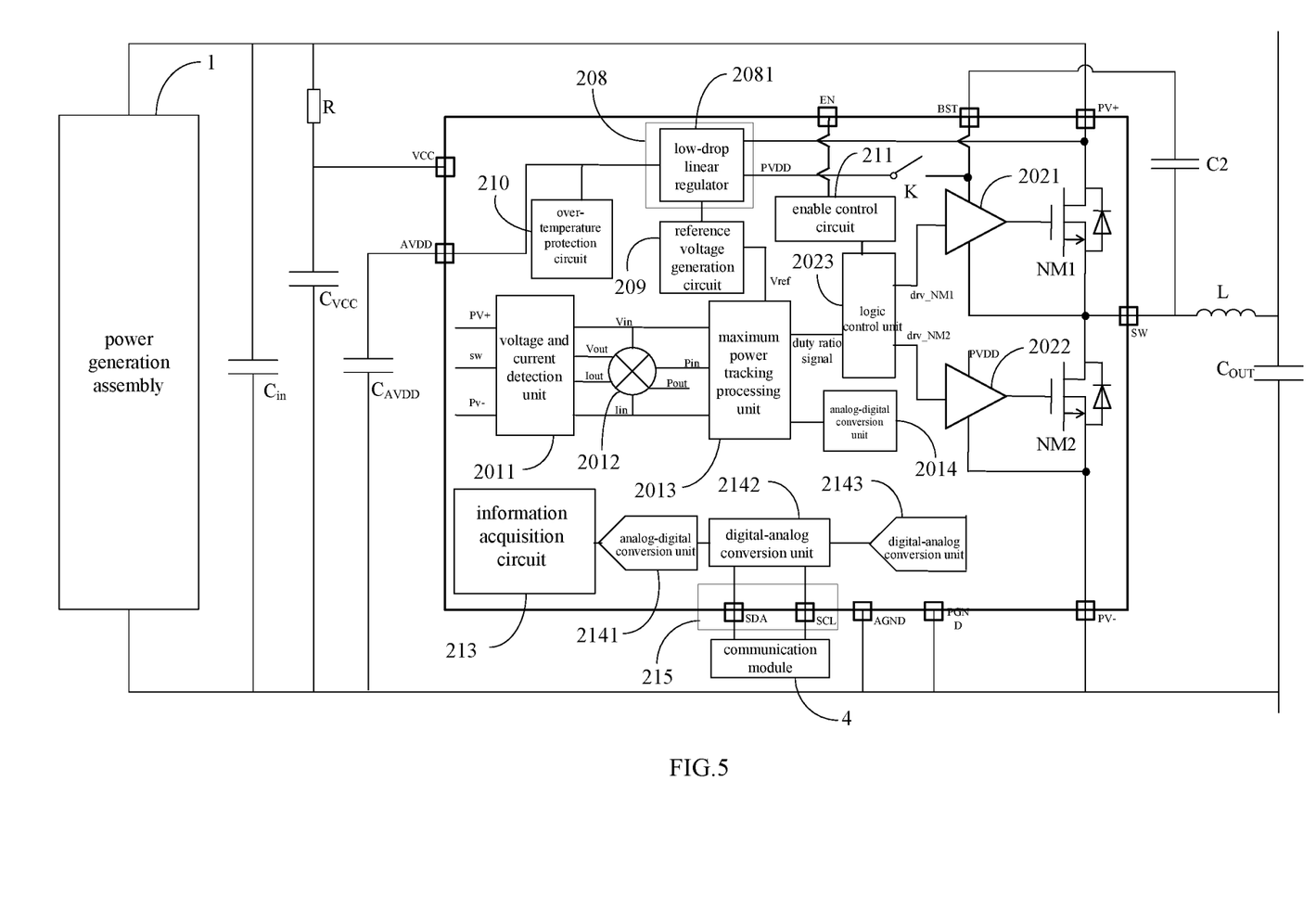
FIG. 5 is a circuit diagram of a power generation device capable of maximum power tracking according to a fifth embodiment of the present invention.

FIG. 5 is a circuit diagram of a power generation device capable of maximum power tracking according to a fifth embodiment of the present invention.

With reference to FIG. 5, the present embodiment may be understood as an implementation of the embodiments shown in FIGS. 1 to 4.

In the embodiment shown in FIG. 5, a PV+ port may be understood to be connected to the power source positive port 206 of the positive output end, a PV− port may be understood to be connected to the power source negative port 207 of the negative output end, an EN port may be understood as the enable port 212 as mentioned above, and a SW port may be understood as the intermediate port as mentioned above. The left side of the voltage and current detection unit 2011 may be understood to be connected to the indicated port respectively.

The MOS transistor NM1 may be understood as the first switch 203 as mentioned above, the MOS transistor NM2 may be understood as the second switch 204 as mentioned above, and the capacitor $C_{out}$ may be understood as the device output capacitor as mentioned above.

The Vin may be understood as a voltage input from the power generation assembly 1 to the optimizer 2, i.e., the assembly output voltage of the power generation assembly 1; correspondingly, the Iin may be understood as the assembly output current of the power generation assembly 1, and the Pin may be understood as the assembly output power of the power generation assembly 1 and also specifically as the assembly output power. Meanwhile, the Vout may be understood as the device output voltage as mentioned above, the Iout may be understood as the device output current as mentioned above, and the Pout may be understood as the device output power as mentioned above.

In an embodiment, the maximum power tracking processing unit 2013 may be connected to an oscillator 2014, and the oscillator 2014 may provide the maximum power tracking processing unit 2013 with a clock signal.

In an embodiment, with reference to FIG. 5, the internal power supply circuit 208 includes a low dropout linear regulator 2081, an input end of the low dropout linear regulator 2081 is directly or indirectly connected to the positive output end such as the PV+ port, and an output end of the low dropout linear regulator 2081 is directly or indirectly connected to the drive control circuit 202, specifically to the first drive unit 2021.

In actual implementation, a power supply end of the first drive unit 2021 is connected to an internal power supply circuit 208 through a power supply control switch K, specifically to the low dropout linear regulator 2081; the power supply end of the first drive unit 2021 is further connected to one end of a boot-strap capacitor C2, and the other end of the boot-strap capacitor C2 is connected to the intermediate port, i.e., to the SW port. In actual implementation, the low dropout linear regulator 2081 is further grounded together with the capacitor $C_{AVDD}$ through an AVDD port.

With the low dropout linear regulator 2081, a voltage of 5V or 3.3V may be generated to be supplied to the internal circuit for operation; as shown in the figure, the first drive unit 2021 may be indirectly powered through the power supply control switch, or the second drive unit 2022 may be powered, e.g., by being directly connected to the power supply end of the second drive unit 2022.

In the implementation shown in FIG. 5, a VCC port of the chip may be connected to the positive output end via a resistance R, and the VCC end of the chip may be grounded via $C_{VCC}$. Further, the RC may be used to filter the power supply end VCC of the chip. Meanwhile, an assembly output capacitor, i.e., a capacitor $C_{in}$, is further connected between the positive output end and the negative output end of the power generation assembly 1.

In the implementation shown in FIG. 5, the communication interface assembly 215 may include an SDA interface and an SCL interface, and the communication control unit 2142 may be connected to a communication module 4 through the SDA interface and the SCL interface. The communication module 4 may be, e.g., an I2C communication module, which may be understood as a communication circuit and a communication line based on an I2C bus communication protocol, and the like.

It can be seen that the AMPPT algorithm integrated in the optimizer involved in the present embodiment not only is suitable for the power tracking of the assembly, but also has the advantages of simple peripheral circuits, low cost, high degree of integration, and high tracking precision and speed. The optimizer may solve the problem of power loss in case of mismatch of the power generation assembly.

If the power generation assembly is a photovoltaic power generation assembly, the optimizer involved in the present embodiment may also solve the problem of heat spot and power loss when the photovoltaic power generation assembly is partially shielded. The optimizer may be assembled on a back surface of a panel of the photovoltaic power generation assembly, which may not affect the power generation of the front surface of the panel.

The number of the optimizer and the chip thereof may be the same as or different from that of the photovoltaic power generation assembly. For example, one photovoltaic power generation assembly corresponds to at least two optimizers and chips thereof; in other words, if there is one optimizer, one optimizer and chip thereof may be disposed on the back surface of the panel of one corresponding photovoltaic power generation assembly; if there are a plurality of optimizers, the plurality of optimizers and chips thereof are distributed on the back surface of the panel of one corresponding photovoltaic power generation assembly. It can be seen that in actual implementation, a plurality of chips with the AMPPT algorithm may be mounted on the back surface of a single panel by dividing the panel into different partitions, so as to solve the problem of mismatch inside the panel, thereby further improving the power generation efficiency of the panel. The principle may refer to the case where a plurality of panels are connected in series.

Figure 6:
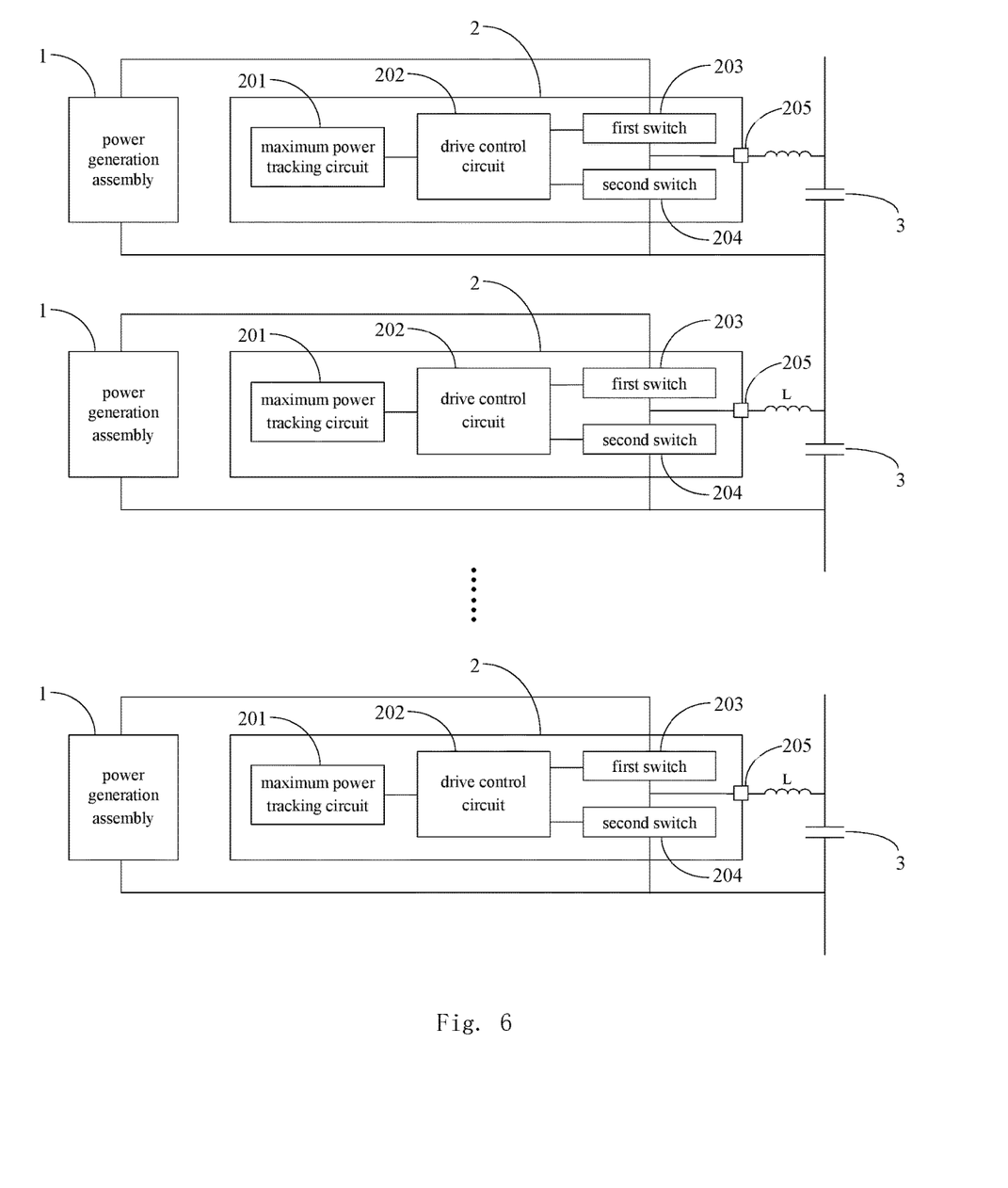
FIG. 6 is a circuit diagram of a power generation system capable of maximum power tracking according to an embodiment of the present invention.

FIG. 6 is a circuit diagram of a power generation system capable of maximum power tracking according to an embodiment of the present invention.

With reference to FIG. 6, the present embodiment further provides a power generation system capable of maximum power tracking, which includes at least two power generation devices capable of maximum power tracking connected in sequence according to at least two of the above optional solutions.

In summary, the power generation device and system capable of maximum power tracking provided by the present invention may directly or indirectly connect the input end of the maximum power tracking circuit to the positive output end, the negative output end and the intermediate port, so as to collect a voltage of the positive output end, a voltage of the negative output end and a voltage of the intermediate port.

The present invention avoids the problem of the existing maximum power point tracking in digital form, wherein the voltage and current information of the power generation assembly is sampled to obtain the power information by analogizing the multiplier so as to regulate the duty ratio for realizing tracking the maximum power point of the power generation assembly, so that the analog-digital conversion and the operation amplification based on the analog-digital conversion are avoided, thereby simplifying the peripheral devices, effectively reducing the cost and facilitating the integration of the circuits in the optimizer as well as realizing a high degree of integration. Meanwhile, compared to the optimized control of digital signals, the calculation time of the micro processor is saved, and the analog circuit may also have a quick responding speed and a higher processing precision. Since the cost is reduced, the power generation efficiency of the assembly is improved and the degree of acceptance of the technology is very high, thereby enabling green energy saving, and facilitating the rapid promotion and mass production of the technology.

At last, it should be noted that the above various embodiments are only used to describe the technical solutions of the present invention, rather than limiting the technical solutions of the present invention. Even through the present invention is described in detail with reference to the foregoing embodiments, those of ordinary skilled in the art should understand that they can still modify the technical solutions recorded in the foregoing various embodiments or equivalently replace some or all of the technical features. However, these modifications or replacements do not make the essence of the corresponding technical solutions deviate from the scope of the technical solutions of the embodiments of the present invention.

What is claimed is:

1. A power generation device capable of maximum power tracking, comprising;
a power generation assembly and at least one optimizer, the optimizer comprises a maximum power tracking circuit, a drive control circuit, a first switch and a second switch arranged in a chip, wherein a first end of the first switch is connected to a positive output end of the power generation assembly, a second end of the first switch is connected to a first end of the second switch, and a second end of the second switch is connected to a negative output end of the power generation assembly; the second end of the first switch and the first end of the second switch are further connected to an intermediate port, and a power is further output to a peripheral circuit of the chip through the intermediate port; the intermediate port is connected to a negative output end of another power generation device;
the maximum power tracking circuit comprises a voltage and current detection unit, a multiplier, and a maximum power tracking processing unit;
the voltage and current detection unit is configured to collect a voltage of the positive output end, a voltage of the negative output end and a voltage of the intermediate port; determine an assembly output voltage of the power generation assembly according to the voltage of the positive output end and the voltage of the negative output end; and determine a current of the first switch according to the voltage of the positive output end and the voltage of the intermediate port as an assembly output current;
the multiplier is configured to multiply the assembly output voltage of the power generation assembly by the assembly output current of the power generation assembly to obtain an assembly output power of the power generation assembly;
the maximum power tracking processing unit is configured to track and determine a current maximum power of the power generation assembly according to the assembly output power, determine a duty ratio signal according to the current maximum power, and send the duty ratio signal to the drive control circuit; and
the drive control circuit is connected to a control end of the first switch and a control end of the second switch respectively for controlling on-off of the first switch and the second switch according to the duty ratio signal.

2. The device according to claim 1, wherein the maximum power tracking processing unit, when determining the duty ratio signal according to the current maximum power, is specifically configured to:
- determine a current reference voltage according to the current maximum power; and
- compare the current reference voltage with a current voltage of a voltage reference signal, and generate the duty ratio signal of a corresponding duty ratio according to a comparison result, wherein the voltage reference signal is a voltage signal of a sine waveform or a voltage signal of a triangular waveform.

3. The device according to claim 2, wherein the optimizer further comprises an internal power supply circuit, the internal power supply circuit is directly or indirectly connected to the positive output end, and the internal power supply circuit is connected to the drive control circuit for powering the drive control circuit by using an output electric energy of the power generation assembly.

4. The device according to claim 2, wherein the optimizer further comprises an over-temperature protection circuit and an enable control circuit;
- the over-temperature protection circuit is configured to detect temperature information of the optimizer, and send a specific enable signal to the enable control circuit when the temperature information is higher than a pre-set temperature threshold value; and
- the enable control circuit is connected to the drive control circuit for controlling the first switch to be turned off by using the drive control circuit when receiving the specific enable signal, so as to disconnect the intermediate port from the power generation assembly and turn on the second switch.

5. The device according to claim 2, further comprising:
- a communication circuit and a communication interface assembly, wherein the communication circuit interacts and communicates externally through the communication interface assembly, and is capable to perform analog-digital conversion on temperature information, assembly output information and device output information of the optimizer and send externally the temperature information, assembly output information and device output information of the optimizer through the communication interface assembly after the analog-digital conversion, as well as receive external information transmitted externally through the communication interface assembly and performing the analog-digital conversion on the external information so that threshold value information is determined according to the external information;
- the assembly output information comprises at least one of the assembly output voltage of the power generation assembly, the assembly output current of the power generation assembly and the assembly output power of the power generation assembly;
- the device output information comprises at least one of a device output voltage of the power generation device, a device output current of the power generation device and a device output power of the power generation device; and
- the threshold value information comprises at least one of a temperature threshold value, a voltage threshold value corresponding to the safety voltage interval and a current threshold value corresponding to the safety current interval.

6. The device according to claim 1, wherein the maximum power tracking processing unit is further connected to the voltage and current detection unit;
- the voltage and current detection unit is further configured to:
- determine a current of the second switch according to the voltage of the negative output end and the voltage of the intermediate port, and add the current of the first switch to the current of the second switch to obtain an output current of the intermediate port;
- the maximum power tracking processing unit is further configured to:
- perform a safety regulation on the duty ratio signal if an output voltage of the intermediate port is not matched with a safety voltage interval corresponding thereto so that the voltage of the intermediate port is matched with the safety voltage interval corresponding thereto;
- perform a safety regulation on the duty ratio signal if the output current of the intermediate port is not matched with a first safety current interval corresponding thereto or the current of the first switch is not matched with a second safety current interval corresponding thereto so that the output current of the intermediate port is matched with the first safety current interval corresponding thereto and the current of the second switch is matched with the second safety current interval corresponding thereto; and
- give priority to the safety regulation if the safety regulation conflicts with the duty ratio signal determined according to the current maximum power.

7. The device according to claim 6, wherein the optimizer further comprises an internal power supply circuit, the internal power supply circuit is directly or indirectly connected to the positive output end, and the internal power supply circuit is connected to the drive control circuit for powering the drive control circuit by using an output electric energy of the power generation assembly.

8. The device according to claim 6, wherein the optimizer further comprises an over-temperature protection circuit and an enable control circuit;
- the over-temperature protection circuit is configured to detect temperature information of the optimizer, and send a specific enable signal to the enable control circuit when the temperature information is higher than a pre-set temperature threshold value; and
- the enable control circuit is connected to the drive control circuit for controlling the first switch to be turned off by using the drive control circuit when receiving the specific enable signal, so as to disconnect the intermediate port from the power generation assembly and turn on the second switch.

9. The device according to claim 6, further comprising:
- a communication circuit and a communication interface assembly, wherein the communication circuit interacts and communicates externally through the communication interface assembly, and is capable to perform analog-digital conversion on temperature information, assembly output information and device output information of the optimizer and send externally the temperature information, assembly output information and device output information of the optimizer through the communication interface assembly after the analog-digital conversion, as well as receive external information transmitted externally through the communication interface assembly and performing the analog-digital conversion on the external information so that threshold value information is determined according to the external information;

the assembly output information comprises at least one of the assembly output voltage of the power generation assembly, the assembly output current of the power generation assembly and the assembly output power of the power generation assembly;

the device output information comprises at least one of a device output voltage of the power generation device, a device output current of the power generation device and a device output power of the power generation device; and the threshold value information comprises at least one of a temperature threshold value, a voltage threshold value corresponding to the safety voltage interval and a current threshold value corresponding to the safety current interval.

10. The device according to claim 1, wherein the drive control circuit comprises a logic control unit, a first drive unit and a second drive unit, wherein an input end of the logic control unit is connected to the maximum power tracking circuit for receiving the duty ratio signal, generating a first drive signal and a second drive signal according to the duty ratio signal, and sending the first drive signal to the first drive unit and sending the second drive signal to the second drive unit;

the logic control unit is connected to the first drive unit and the second drive unit respectively, an output end of the first drive unit is connected to the control end of the first switch, and an output end of the second drive unit is connected to the control end of the second switch; and the first drive unit is configured to control the on-off of the first switch according to the first drive signal, and the second drive unit is configured to control on-off of the second switch according to the second drive signal.

11. The device according to claim 10, wherein a power supply end of the first drive unit is connected to an internal power supply circuit through a power supply control switch, the power supply end of the first drive unit is further connected to one end of a boot-strap capacitor, and the other end of the boot-strap capacitor is connected to the intermediate port.

12. The device according to claim 11, wherein the optimizer further comprises the internal power supply circuit, the internal power supply circuit is directly or indirectly connected to the positive output end, and the internal power supply circuit is connected to the drive control circuit for powering the drive control circuit by using an output electric energy of the power generation assembly.

13. The device according to claim 10, wherein the optimizer further comprises an internal power supply circuit, the internal power supply circuit is directly or indirectly connected to the positive output end, and the internal power supply circuit is connected to the drive control circuit for powering the drive control circuit by using an output electric energy of the power generation assembly.

14. The device according to claim 10, wherein the optimizer further comprises an over-temperature protection circuit and an enable control circuit;

the over-temperature protection circuit is configured to detect temperature information of the optimizer, and send a specific enable signal to the enable control circuit when the temperature information is higher than a pre-set temperature threshold value; and the enable control circuit is connected to the drive control circuit for controlling the first switch to be turned off by using the drive control circuit when receiving the specific enable signal, so as to disconnect the intermediate port from the power generation assembly and turn on the second switch.

15. The device according to claim 10, further comprising:

a communication circuit and a communication interface assembly, wherein the communication circuit interacts and communicates externally through the communication interface assembly, and is capable to perform analog-digital conversion on temperature information, assembly output information and device output information of the optimizer and send externally the temperature information, assembly output information and device output information of the optimizer through the communication interface assembly after the analog-digital conversion, as well as receive external information transmitted externally through the communication interface assembly and performing the analog-digital conversion on the external information so that threshold value information is determined according to the external information;

the assembly output information comprises at least one of the assembly output voltage of the power generation assembly, the assembly output current of the power generation assembly and the assembly output power of the power generation assembly;

the device output information comprises at least one of a device output voltage of the power generation device, a device output current of the power generation device and a device output power of the power generation device; and the threshold value information comprises at least one of a temperature threshold value, a voltage threshold value corresponding to the safety voltage interval and a current threshold value corresponding to the safety current interval.

16. The device according to claim 1, wherein the optimizer further comprises an internal power supply circuit, the internal power supply circuit is directly or indirectly connected to the positive output end, and the internal power supply circuit is connected to the drive control circuit for powering the drive control circuit by using an output electric energy of the power generation assembly.

17. The device according to claim 16, further comprising a reference voltage generation circuit, wherein the reference voltage generation circuit is connected to the internal power supply circuit and the maximum power tracking circuit respectively for providing the maximum power tracking circuit with a reference voltage for determining the duty ratio signal by using the power supply of the internal power supply circuit.

18. The device according to claim 1, wherein the optimizer further comprises an over-temperature protection circuit and an enable control circuit;

the over-temperature protection circuit is configured to detect temperature information of the optimizer, and send a specific enable signal to the enable control circuit when the temperature information is higher than a pre-set temperature threshold value; and the enable control circuit is connected to the drive control circuit for controlling the first switch to be turned off by using the drive control circuit when receiving the specific enable signal, so as to disconnect the intermediate port from the power generation assembly and turn on the second switch.

19. The device according to claim 1, further comprising:
a communication circuit and a communication interface assembly, wherein the communication circuit interacts and communicates externally through the communication interface assembly, and is capable to perform analog-digital conversion on temperature information, assembly output information and device output information of the optimizer and send externally the temperature information, assembly output information and device output information of the optimizer through the communication interface assembly after the analog-digital conversion, as well as receive external information transmitted externally through the communication interface assembly and performing the analog-digital conversion on the external information so that threshold value information is determined according to the external information;

the assembly output information comprises at least one of the assembly output voltage of the power generation assembly, the assembly output current of the power generation assembly and the assembly output power of the power generation assembly;

the device output information comprises at least one of a device output voltage of the power generation device, a device output current of the power generation device and a device output power of the power generation device; and the threshold value information comprises at least one of a temperature threshold value, a voltage threshold value corresponding to the safety voltage interval and a current threshold value corresponding to the safety current interval.

20. A power generation system capable of maximum power tracking, comprising at least two power generation devices capable of maximum power tracking connected in sequence according to claim 1.

* * * * *